(12) United States Patent
Delaporte et al.

(10) Patent No.: US 6,672,150 B2
(45) Date of Patent: Jan. 6, 2004

(54) HOUSING FOR A TIRE PRESSURE SENSOR FOR A MOTOR VEHICLE

(75) Inventors: Francis Delaporte, Osny (FR); Didier Pozzi, Saint Ouen l'Aumone (FR)

(73) Assignee: Johnson Controls Automotive Electronics, Osny (FR)

( * ) Notice: Subject to any disclaimer, the term of this patent is extended or adjusted under 35 U.S.C. 154(b) by 0 days.

(21) Appl. No.: 09/879,614

(22) Filed: Jun. 12, 2001

(65) Prior Publication Data

US 2002/0029627 A1 Mar. 14, 2002

(30) Foreign Application Priority Data

Jun. 15, 2000 (FR) .............................. 00 07625

(51) Int. Cl.⁷ .................... B60C 23/02; G01M 17/02
(52) U.S. Cl. .................... 73/146.2; 73/146; 152/415; 137/227
(58) Field of Search ................ 73/146–146.8; 156/152; 340/442, 447; 361/283; 152/225, 415; 72/316; 316/34; 137/227

(56) References Cited

U.S. PATENT DOCUMENTS

| 4,000,639 A | * | 1/1977 | Postema ...................... 72/316 |
| 4,036,273 A | * | 7/1977 | Kemper .................... 152/225 R |
| 4,071,724 A | * | 1/1978 | Lejeune ................... 200/61.25 |
| 5,637,926 A | | 6/1997 | Mikic et al. ................ 307/10.1 |
| 5,731,754 A | * | 3/1998 | Lee, Jr. et al. .............. 340/447 |
| 6,082,192 A | * | 7/2000 | Koch et al. ................ 73/146.5 |

FOREIGN PATENT DOCUMENTS

FR  2 661 373  4/1990  .......... B60C/23/04

* cited by examiner

Primary Examiner—Ren Yan
Assistant Examiner—Marissa Ferguson
(74) Attorney, Agent, or Firm—Foley & Lardner

(57) ABSTRACT

The tire pressure sensor housing for a motor vehicle, provided to be mounted on a wheel rim comprises elastically deformable support wings of variable height and a device for positional fixing and locking having snap-on tongues.

27 Claims, 2 Drawing Sheets

HOUSING FOR A TIRE PRESSURE SENSOR FOR A MOTOR VEHICLE

FIELD OF THE INVENTION

The present invention is directed to a tire pressure sensor housing for a motor vehicle, where the housing comprises support wings having a variable height.

BACKGROUND OF THE INVENTION

A tire pressure sensor for a motor vehicle wheel serves to indicate to the driver, via the on-board computer, any abnormality in the tire liable to compromise his safety.

The sensor is placed in the tire and, more precisely, it is fixed on the circumferential periphery of the wheel rim and is pressed against it in order to avoid vibration. Since wheel rims are not universal and there are several diameters of wheel rim, there must therefore be as many types of sensor housing as wheel rim types.

The housings can therefore only be produced in limited production runs.

The present invention aims to propose universal pressure sensor housings.

SUMMARY OF THE INVENTION

To this end the invention relates to a tire pressure sensor housing for a motor vehicle wheel, arranged to be mounted on the wheel rim, characterized in that it comprises support wings of variable height.

It will be noted that a distinction must be made between the height and length of the wings and that height must be understood to mean the distance between the plane of the support lines of the wings and the opposite external plane of the housing, fixed in position a priori with respect to the axis of the wheel rims. In other words, this height corresponds to the radial shape of the sensor of the invention.

By means of the invention, the housing can thus rest on wheel rims of any radius of curvature. The housing can thus be fixed without any need to adjust to wheel rims of different diameters, while still being pressed firmly.

The support wings are advantageously elastically deformable.

BRIEF DESCRIPTION OF THE DRAWINGS

The invention will be better understood with the aid of the following description of two embodiments of the housing of the invention with reference to the attached drawing in which.

DETAILED DESCRIPTION OF THE PREFERRED EMBODIMENTS OF THE INVENTION

Figure 1:
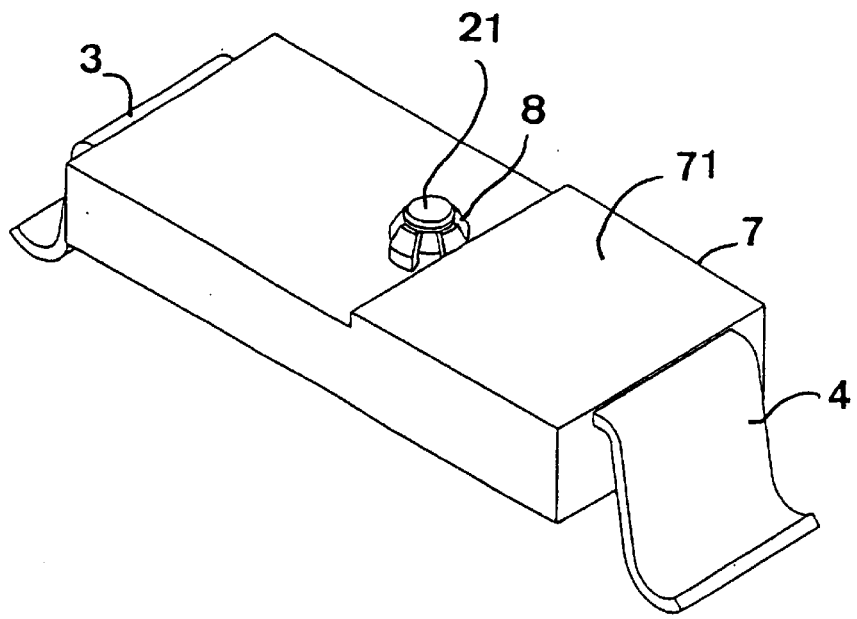
FIG. 1 is a perspective view of the first embodiment of the housing of the invention.
Figure 2:
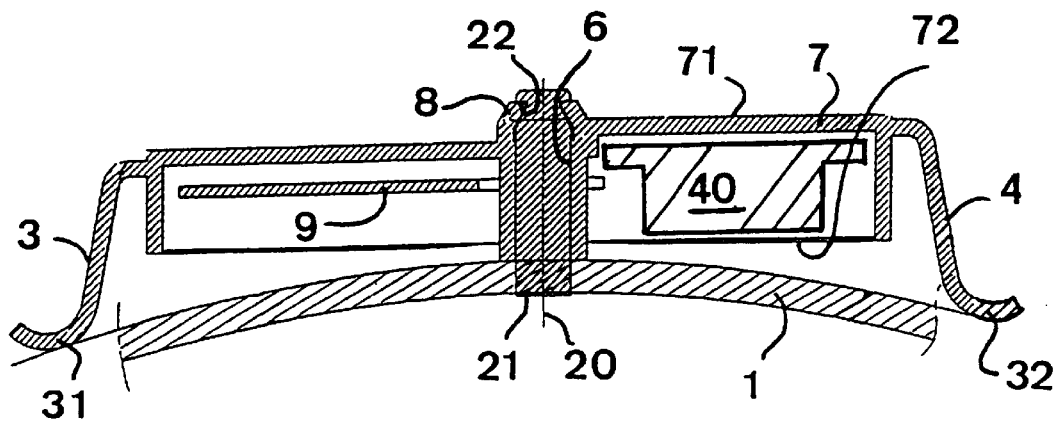
FIG. 2 is a cross-sectional view of the housing of FIG. 1 in a radial plane of a wheel rim on which it is mounted.

With reference to FIGS. 1 and 2, the housing of the first embodiment comprises a body 7 of a substantially parallelepiped rectangular form extending in the circumferential direction of a wheel rim 1 of a motor vehicle wheel which carries the housing.

The housing body 7 extends at the two ends in its direction of extension by two respective wings 3 and 4 for resting on the wheel rim 1 and more precisely on the substantially cylindrical surface portion thereof on which the tire will be mounted. The wings 3, 4, which in this case are elastically deformable, are of variable height and rest on the wheel rim 1 by two curved end portions 31, 32. The wings 3,4 are thus resting on two angularly spaced zones of the wheel rim 1 and the housing body 7 extends within the angular sector concerned, with a radial spacing between the surface of the wheel rim 1, which is a circle in FIG. 2, and the surface 72, in this case considered the lower surface, of the housing body 7, i.e. that turned inwards towards the wheel rim 1.

The wings 3, 4 each extend substantially in a plane parallel to the axis of the wheel rim 1 and more precisely they are, at rest, substantially parallel to the end faces of the body 7 to which they are respectively attached. The wings 3, 4 are in this case attached to the body 7 substantially at the level of the surface 71, considered the upper surface, of the body 7, which is turned towards the outside and away from the wheel rim 1.

A stud 21 is fixed to the cylindrical surface of the wheel rim 1 and protrudes radically outwards to receive the housing 3, 4 ,7 which, for this purpose, has a well 6 for receiving the fixing stud 21, the well 6 being in this case central and thus located mid-way between the two lateral wings 3, 4.

In the present description the radial direction designates, unless stated otherwise, a direction orthogonal to the axis of rotation of the wheel rim 1 and more precisely it designates the radial direction along the axis 20 of the stud 21 and of the well 6. In the same way, a horizontal plane in this case designates any plane perpendicular to this radial direction, considered in this case as being a perpendicular. It will be understood that this is a particular case intended to facilitate the description and in no way limiting the invention.

In the housing body 7 the external wall of the well 6 has attached to it, on one side, a printed circuit board 9 parallel to the horizontal surfaces 71, 72, carrying active components of the sensor, and, on the other side, a battery 40 for powering the board 9 is disposed.

The stud 21 comprises, in the region of its free end, a circular groove 22 extending in a plane considered horizontal, intended to cooperate with a vertical crown of elastic tongues or snap-on catches 8 fixedly attached to the body 7 and extending radically outwards from the region of the upper surface 71 surrounding the orifice of the well 6.

The radial distance from the wheel rim 1 to the groove 22 is sufficient to ensure the existence of the radial space, mentioned above, between the lower surface 72 of the body 7 and the wheel rim 1.

The radial gaps between the various points of the substantially planar lower surface 72 of the housing body 7 and circles of various curvatures representing wheel rims 1 of various diameters thus increase with the angular spacing or distance from the point concerned to the well 6. This increase is all the quicker when the diameter of the wheel rim 1 is small and thus the curvature is great.

In the two support regions of the portions 31, 32, the wings 3, 4 compensate, by their elasticity, for variations in the height of the housing body 7 according to the value of the diameter of the wheel rim 1, these height variations being considered in the vertical direction of the stud 21, the length of which determines the mounting height of the housing body 7 on the wheel rim 1.

The housing 3, 4, 7 is thus fixed with positional locking, the catches 8 preventing any upwards withdrawal of the body 7 with respect to the stud 21 under the effect of acceleration and/or the elastic wings 3, 4 which tend to push it away from the wheel rim 1. Through the body 7 and the catches 8, the wings 3, 4 are hooked on the free end of the stud 21 in order to exert an elastic return force from their support ends 31, 32 to the wheel rim 1. The housing 3, 4, 7 is thus pressed against the wheel rim and any relative movement such as vertical vibration or rotation about the axis of the stud 21 is avoided.

The catches 8 permit rapid mounting by snap-on attachment of the housing 3, 4, 7 onto the wheel rim 1 as they lock it in position when the groove 22 emerges sufficiently from the well 6. As shown, the catches 8 ensure irreversible attachment. In one variation, the groove 22 has a conical upper slope which is also not in a horizontal plane and which permits the catches 8 to be moved apart by exerting upwardly directed traction on the housing 7 of an intensity exceeding the resistance threshold of the catches 8.

Figure 3:
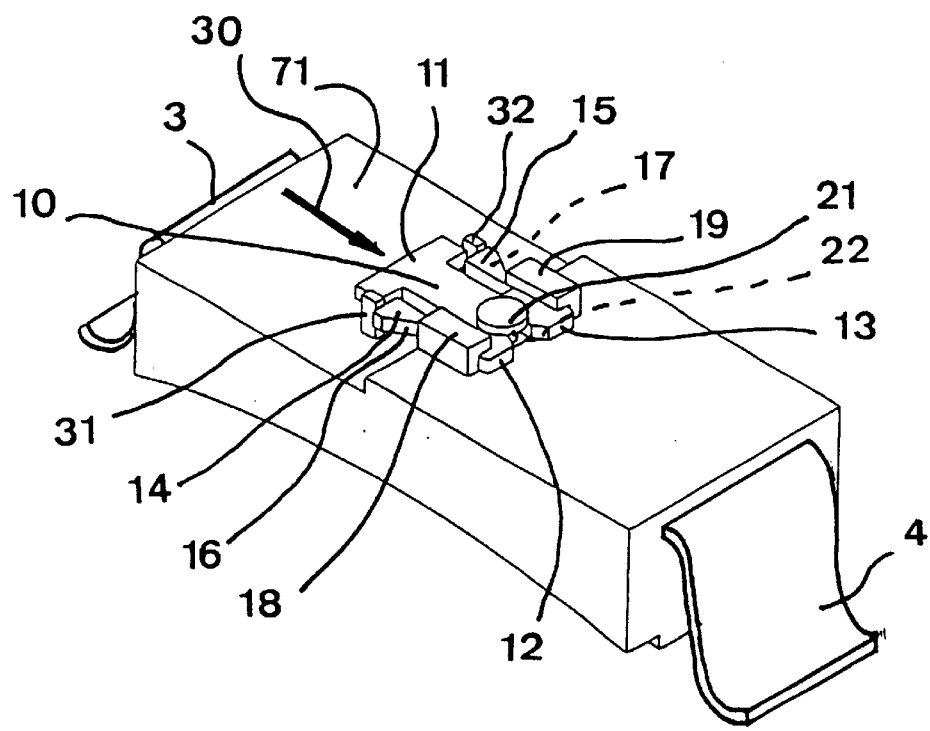
FIG. 3 is a perspective view of the second embodiment of the housing of the invention and FIG. 4 is a cross-sectional view of the housing of FIG. 3 in a radial plane of a wheel rim on which it is mounted.
Figure 4:
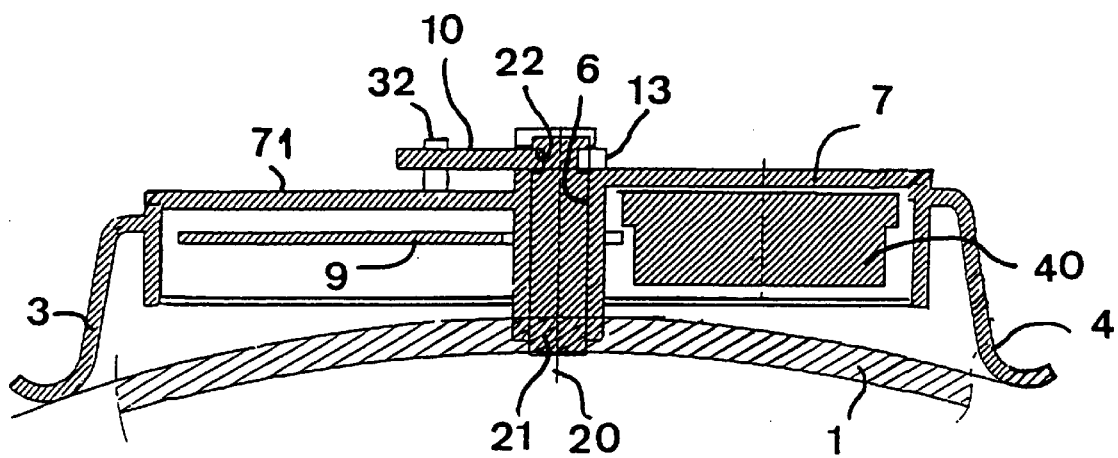

FIGS. 3 and 4 show the second embodiment. The elements which are counterparts of those in FIGS. 1 and 2 retain their reference numbers. FIGS. 3 and 4 are intended principally to illustrate another mechanism for fixing the housing body 7 on the stud 21 comprising the groove 22. The mechanism illustrated, disposed on the upper surface 71 and replacing the catches 8, comprises a movable clip 10 cooperating with the groove 22 to lock the housing 7 with respect to the stud 21 in a position at a specific height.

The clip 10 is in the form of a plate comprising, at one end, two protrusions 12, 13 forming a sort of fork intended to partially surround the stud 21 by engaging in the groove 22 in order thus to block any vertical movement between the stud 21 and the clip 10 in order to block any subsequent sliding of the housing 7 on the stud 21.

The clip 10 slides over the upper surface 71 and cooperates with two opposite lateral guides 18, 19 which permit it to be slid forwards in the direction of the horizontal arrow 30 to reach its afore-mentioned operational position of cooperation with the groove 22, and backwards to disengage it therefrom. In this case, the direction of the arrow 30 is the direction in which the housing 7 extends. The direction of the arrow 30 for moving the clip 10 is thus substantially orthogonal to the support wings 3, 4 which are substantially parallel to the corresponding end faces of the body 7 extending in substantially vertical planes, and one of which is visible on the right part of FIG. 3.

The guides 18, 19, with cross-sections in the form of vertical hooks turned to face each other, each ensure lateral contact with the respective protrusions 12, 13, thus avoiding any rotation of the clip 10 in its horizontal plane. Their hooked end parts ensure contact with the top side of the protrusions 12, 13, thus preventing the clip 10 from moving away from the surface 71, this maintains the vertical position of the housing 7 on the stud 21. The surface 71, on which the clip 10 slides, and the guides 18, 19 thus form a sort of fitting sleeve permitting sliding of the clip 10 in only one direction or the other in line with the arrow 30.

In order to lock the clip 10 in the forward, operational position it has two lateral elastic tongues 14, 15 which are deformable in the plane of the clip 10, each comprising an external lateral region 16, 17 forming a wedge, extending in a vertical plane inclined with respect to the direction of the arrow 30 and partially turned towards this direction. As shown by FIG. 3, two lateral stops 31, 32, in the form of vertical bars fixedly attached to the surface 71 have a spacing slightly less than the width of the portion of the tongues 14, 15 comprising the inclined regions 16, 17. By sliding of the clip 10 according to the arrow 30, the inclined regions 16, 17 forming a wedge come into contact with the respective stops 31, 32 and the tongues 14, 15 flex towards each other until their rear part, which has a free end, exceeds the stops 31 and 32. The tongues 14, 15 then resume their at-rest shape, their rear free end surface facing opposite to the arrow 30 thus coming to face the stops 31, 32 which prevent any return movement of the clip 10 when it has reached its operative locking position.

The clip 10 is unlocked manually by laterally pressing the two tongues 14, 15 to bring them towards each other in order to engage them between the stops 31, 32, thus causing the clip 10 to slide backwards. The non-return stops 31, 32 also have, in this example, a function of roughly laterally guiding the base 11 of the clip 10, which is opposite to the protrusions 12, 13 and they thus cooperate with the guides 18, 19.

What is claimed is:

1. A tire pressure sensor housing for a motor vehicle, arranged to be mounted on a wheel rim, comprising a body extended by a plurality of elastically deformable wings, the wings being of variable height and having end portions for resting on the wheel rim, wherein the body comprises means for positional fixing and is configured to hold a pressure sensor.

2. The pressure sensor housing according to claim 1, wherein the means for positional fixing comprises snap-on means.

3. The pressure sensor housing according to claim 1, wherein the means for positional fixing can be unlocked.

4. The pressure sensor housing of claim 3, wherein the means for positional fixing comprises a movable clip.

5. The pressure sensor housing according to claim 4, wherein the movable clip is mounted in a movable manner substantially orthogonal to the support wings.

6. The pressure sensor housing according to claim 1, wherein a well is provided to receive a fixing stud.

7. The pressure sensor housing of claim 1, wherein the housing is configured to be mounted on the substantially cylindrical surface portion of the wheel rim on which a tire will be mounted.

8. A tire pressure sensor housing for a motor vehicle arranged to be mounted on a wheel rim comprising:
   a body configured to hold a pressure sensor; and
   a plurality of elastically deformable wings coupled to the body, the wings having end portions for resting on the wheel rim;
   wherein the housing is configured to be mounted on the substantially cylindrical surface portion of a wheel rim around which portion a tire will be mounted.

9. The housing of claim 8, wherein the end portions are curved.

10. The housing of claim 8, further comprising a well in the housing for receiving a fixing stud.

11. The housing of claims 8, further comprising catches coupled to the body, which catches engage a stud and prevent upward withdrawal of the housing.

12. The housing of claim 8, further comprising a clip that facilitates mounting the housing to the wheel rim.

13. The pressure sensor housing of claim 8, further comprising a pressure sensor coupled to the body.

14. A tire pressure sensor housing for a motor vehicle arranged to be mounted on a wheel rim comprising:
   a body configured to hold a pressure sensor;
   a plurality of means for resting the housing on the wheel rim, which means are coupled to the body; and a means for fixing the housing to the wheel rim;

wherein the housing is configured to be mounted on the substantially cylindrical surface portion of a wheel rim around which portion a tire will be mounted.

15. The housing of claim 14, wherein the means for fixing the housing to the wheel rim includes a well in the housing for receiving a fixing stud, and a clip.

16. The housing of claim 14, wherein the means for fixing the housing to the wheel rim includes a well in the housing for receiving a fixing stud, and catches.

17. The housing of claim 16, wherein the means for fixing the housing to the wheel rim includes a groove with a conical upper slope.

18. The pressure sensor housing of claim 14, further comprising a pressure sensor coupled to the body.

19. A tire pressure sensor for a motor vehicle arranged to be mounted on a wheel comprising:

a housing having an external plane;

a printed circuit board coupled to the housing and carrying components of a tire pressure sensor; and a plurality of wings coupled to the housing having support regions at one end and a height defined between at least one of the support regions and the external plane of the housing, wherein the height is variable.

20. The sensor of claim 19, wherein the wings extend substantially in a plane parallel to the axis of the wheel rim.

21. The sensor of claim 19, further comprising a positional locking device configured to fix the body to the wheel.

22. The pressure sensor housing of claim 19, wherein the housing is configured to be mounted on the substantially cylindrical surface portion of the wheel rim on which a tire will be mounted.

23. A housing for a component to be mounted on a wheel rim, comprising:

a body configured to hold the component; and a plurality of elastically deformable wings coupled to the body, the wings having end portions for resting on the rim;

wherein the housing is configured to be mounted on the substantially cylindrical surface portion of a wheel rim around which portion a tire will be mounted.

24. The housing of claim 23, wherein the component the body is configured to carry is an electronic component.

25. The housing of claim 23, further comprising an electronic component.

26. The housing of claim 25, wherein the electronic component is a pressure sensor, and the body is configured to carry the pressure sensor.

27. The housing of claim 23, wherein the component the body is configured to carry is a pressure sensor having an air inlet, and the body is configured to allow air to pass from a cavity formed by the wheel rim and the tire to the air inlet of the pressure sensor.

* * * * *